US008469433B2

(12) United States Patent
Krajenke et al.

(10) Patent No.: US 8,469,433 B2
(45) Date of Patent: Jun. 25, 2013

(54) DECKLID HINGE COUNTERBALANCE ASSEMBLY HAVING A STRAIGHT-END TORQUE ROD

(75) Inventors: Gary W. Krajenke, Warren, MI (US); Alvin N. Standard, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 13/186,825

(22) Filed: Jul. 20, 2011

(65) Prior Publication Data

US 2013/0020826 A1 Jan. 24, 2013

(51) Int. Cl.
*B62D 25/12* (2006.01)

(52) U.S. Cl.
USPC ........................................ 296/76; 296/146.11

(58) Field of Classification Search
USPC ................. 296/146.11, 76, 207; 16/289, 290, 16/298, 320, 308, 82
See application file for complete search history.

(56) References Cited

U.S. PATENT DOCUMENTS

| | | | | |
|---|---|---|---|---|
| 2,783,495 | A * | 3/1957 | Vigmostad | 16/308 |
| 4,378,658 | A | 4/1983 | DeLorean | |
| 7,469,953 | B2 * | 12/2008 | Heath et al. | 296/76 |
| 8,251,431 | B2 * | 8/2012 | Nakazato | 296/76 |
| 2002/0096905 | A1 * | 7/2002 | Nicholas et al. | 296/76 |

FOREIGN PATENT DOCUMENTS

| | | |
|---|---|---|
| JP | 2010215135 A | 9/2010 |

* cited by examiner

*Primary Examiner* — Jason S Morrow
(74) *Attorney, Agent, or Firm* — Quinn Law Group, PLLC

(57) ABSTRACT

A counterbalanced decklid hinge assembly for rotatably supporting a decklid relative to a vehicle includes a torque rod extending between a first hinge box and a second hinge box. A support member is rotatably supported by each of the first and second hinge boxes. A linkage system interconnects one axial end of the torque rod to one of the support members, and is attached to the axial end of the torque rod in a manner that allows for a straight axial end of the torque rod, i.e., requires no bends. A lever is attached to and rotatable with the other axial end of the torque rod, and is attached in a manner that allows for a straight axial end of the torque rod, i.e., requires no bends.

18 Claims, 4 Drawing Sheets

DECKLID HINGE COUNTERBALANCE ASSEMBLY HAVING A STRAIGHT-END TORQUE ROD

TECHNICAL FIELD

The invention generally relates to a hinge assembly for rotatably supporting a decklid of a vehicle, and more specifically to a counterbalanced hinge assembly having a twisted torque rod extending between a pair of hinge boxes for applying an opening force to the decklid.

BACKGROUND

Counterbalanced decklid hinge assemblies typically include at least one torque rod that extends between a pair of hinge boxes. A support member is rotatably attached to and supported by each of the hinge boxes. One end of the torque rod is bent in a manner to engage one of the hinge boxes, and the other end of the torque rod is bent in a manner to engage one of the support members. The torque rod is twisted during assembly to pre-load the torque rod. The pre-loaded torque rod acts as a spring to untwist, thereby applying a torque to the support member to assist in opening the decklid.

The amount of torque that the torque rod is capable of storing is dependent upon the length of the torque rod, with the bent ends of the torque rod reducing the overall effective length of the torque rod. Furthermore, the bent ends of the torque rod induce bending stresses into the torque rod, which decreases the durability of the torque rod.

SUMMARY

A decklid hinge assembly for a vehicle is provided. The decklid hinge assembly includes a first hinge box and a second hinge box. The second hinge box is spaced from the first hinge box. Each of the first hinge box and the second hinge box are configured for attachment to the vehicle. A first support member is rotatably attached to the first hinge box. A second support member is rotatably attached to the second hinge box. The first support member and the second support member are configured for simultaneous rotation about a rotation axis between a closed position and an open position. The decklid hinge assembly further includes a torque mechanism. The torque mechanism includes a first torque rod that extends between and is rotatably supported by the first hinge box and the second hinge box. The first torque rod includes a first axial end and a second axial end. The second axial end is pre-loaded with a twisting moment relative to the first axial end to generate a twisting torque. A first lever is attached to and rotatable with one of the first axial end and the second axial end of the first torque rod, and is secured in a position relative to one of the first hinge box and the second hinge box. A first linkage system interconnects another of the first axial end and the second axial end of the first torque rod, and one of the first support member and the second support member. The first linkage system is configured for transferring the torque from the first torque rod to the one of the first support member and the second support member to assist the simultaneous movement of the first support member and the second support member from the closed position into the open position.

A vehicle is also provided. The vehicle includes a body that extends along a longitudinal axis. The body defines an opening. A decklid is coupled to the body and is configured for sealing the opening. A decklid hinge assembly rotatably attaches the decklid to the body for rotation about a rotation axis between a closed position and an open position. The decklid hinge assembly includes a first hinge box and a second hinge box. The second hinge box is laterally spaced from the first hinge box across the longitudinal axis of the body. Each of the first hinge box and the second hinge box are attached to the body. A first support member is rotatably attached to the first hinge box. A second support member is rotatably attached to the second hinge box. The first support member and the second support member are configured for simultaneous rotation about the rotation axis between the closed position and the open position. The decklid hinge assembly includes a torque mechanism that is configured for applying a torque to the first support member and the second support member. The torque assists the simultaneous movement of the first support member and the second support member from the closed position into the open position. The torque mechanism includes a first torque rod and a second torque rod. The first torque rod extends between and is rotatably supported by the first hinge box and the second hinge box. The first torque rod includes a first axial end that is disposed adjacent the first hinge box, and a second axial end that is disposed adjacent the second hinge box. The first axial end and the second axial end of the first torque rod are pre-loaded with a twisting moment relative to each other to generate a twisting torque. A first lever is attached to and is rotatable with the first axial end of the first torque rod, and is secured in a position relative to the first hinge box. A first linkage system interconnects the second axial end of the first torque rod and the second support member. The first linkage system is configured for transferring the torque from the first torque rod to the second support member. The second torque rod extends between and is rotatably supported by the first hinge box and the second hinge box. The second torque rod includes a first axial end disposed adjacent the second hinge box, and a second axial end disposed adjacent the first hinge box. The first axial end and the second axial end of the second torque rod are pre-loaded with a twisting moment relative to each other to generate a twisting torque. A second lever is attached to and is rotatable with the first axial end of the second torque rod, and is secured in a position relative to the second hinge box. A second linkage system interconnects the second axial end of the second torque rod and the first support member. The second linkage system is configured for transferring the torque from the second torque rod to the first support member.

Accordingly, no bends in the torque rods are required to connect the torque rods to either the hinge boxes or the support members. More specifically, the levers connect one axial end of each torque rods to one of the hinge boxes, and the linkage systems connect the other axial end of each of the torque rods to one of the support members. The lever and the linkage systems are attached to the torque rods in a manner that eliminates any bends in the torque rod, thereby reducing and/or eliminating any bending stresses in the torque rods. Additionally, because no bends are required to secure the axial ends of the torque rods to the hinge boxes and/or the support members, the overall length of the torque rods may be maximized to fit within the cross vehicle packaging restraints of the vehicle.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
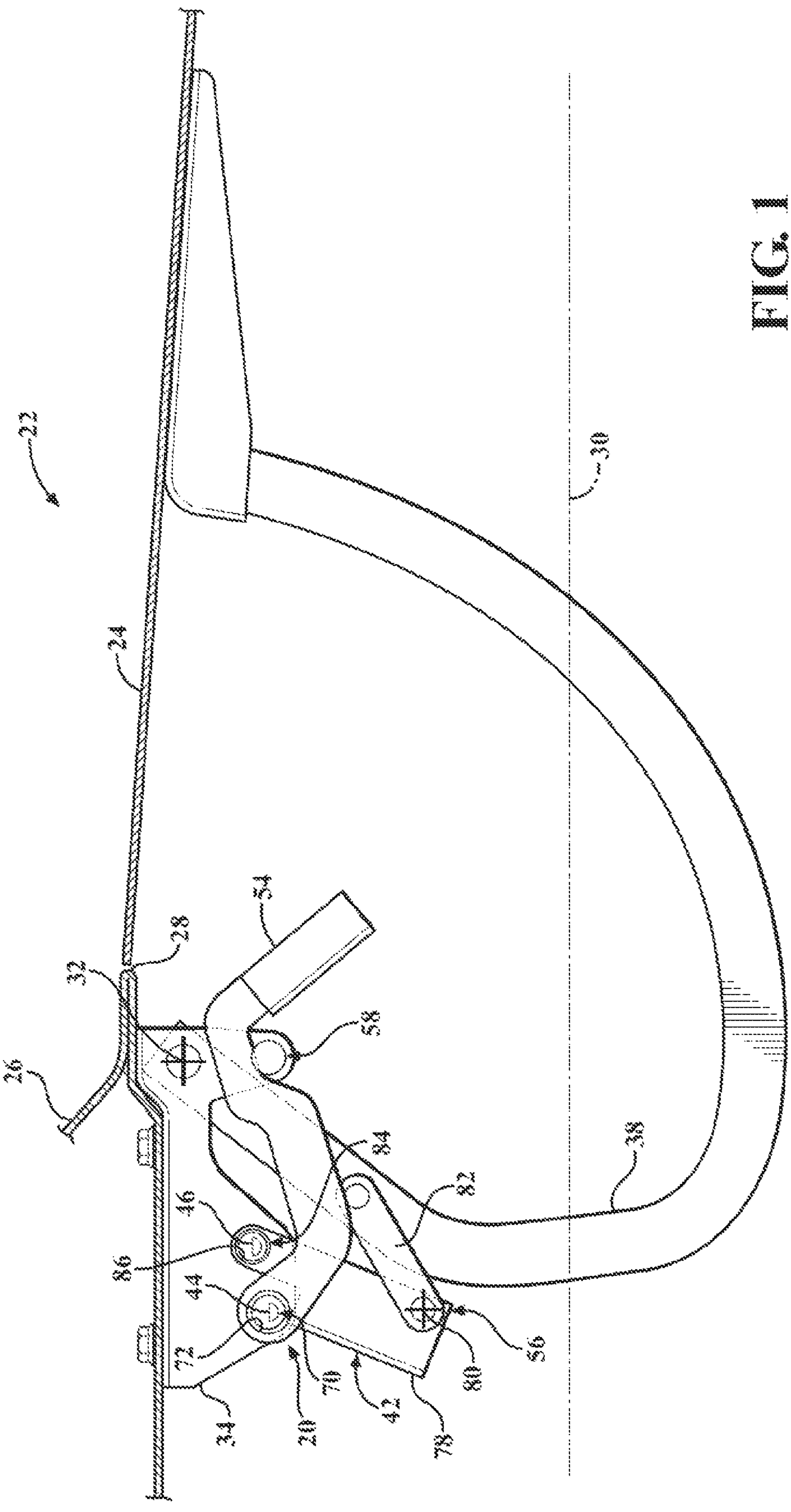
FIG. 1 is a schematic cross sectional view from a side of the vehicle showing the hinge assembly.

Referring to the Figures, wherein like numerals indicate like parts throughout the several views, a decklid hinge assembly, hereinafter referred to as the hinge assembly, is generally shown at 20. Referring to FIG. 1, the hinge assembly 20 is for a vehicle 22, and rotatably couples a decklid 24 to a body 26 of the vehicle 22. The decklid 24 seals an opening 28 defined by the body 26, such as for example, a trunk or cargo area of the vehicle 22.

The body 26 extends along a longitudinal axis 30 between a forward end of the body 26 and a rearward end of the body 26. The hinge assembly 20 rotatably attaches the decklid 24 to the body 26 for rotation about a rotation axis 32. As shown, the rotation axis 32 is perpendicular relative to the longitudinal axis 30 of the vehicle 22. However, the relative positions between the rotation axis 32 and the longitudinal axis 30 of the vehicle 22 may differ from that shown and described herein. The decklid 24 is rotatable between a closed position for sealing the opening 28, and an open position for allowing access to the opening 28.

Figure 2:
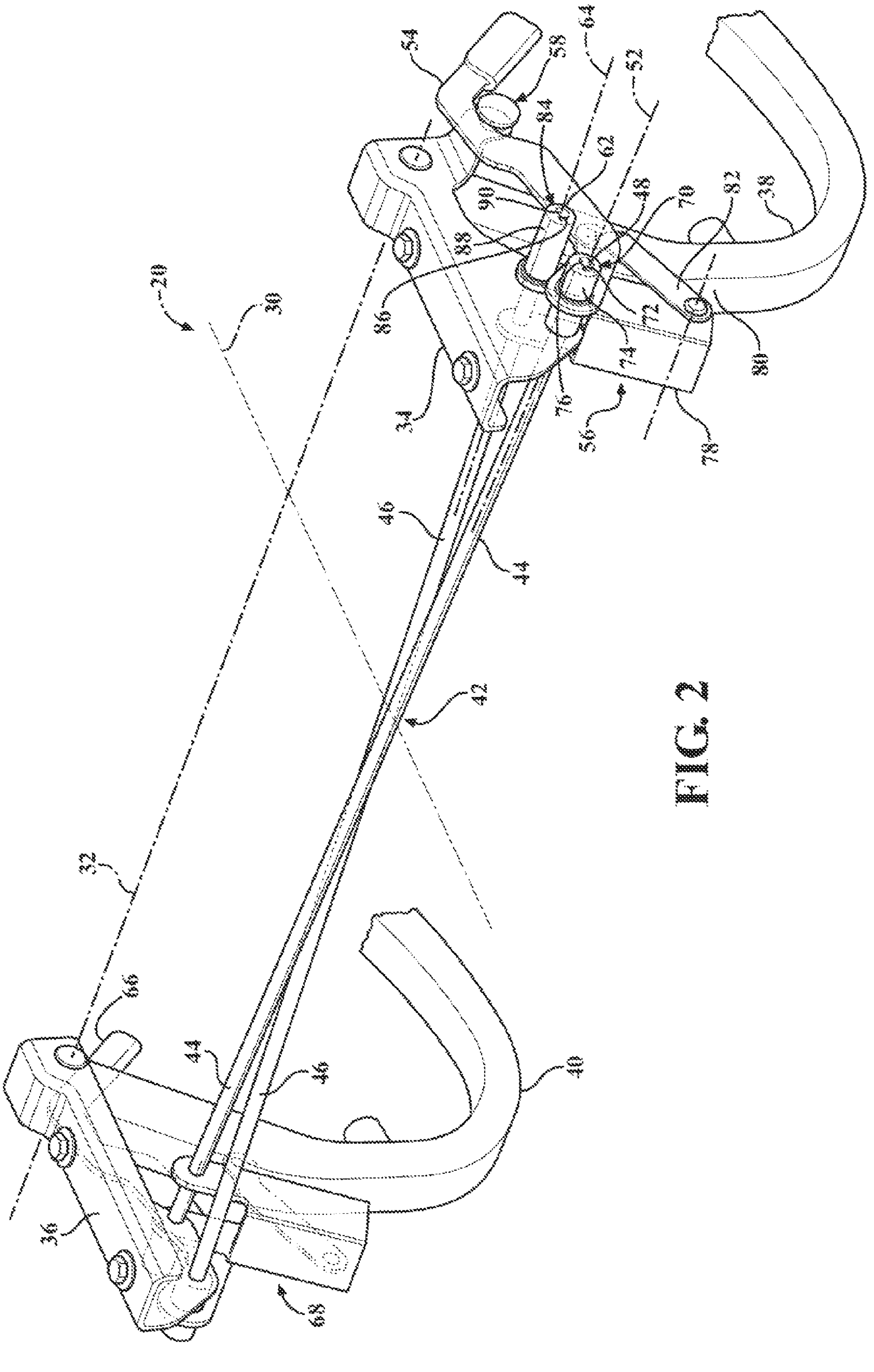
FIG. 2 is a schematic perspective view from a first angle of a hinge assembly for rotatably supporting a decklid of a vehicle.
Figure 3:
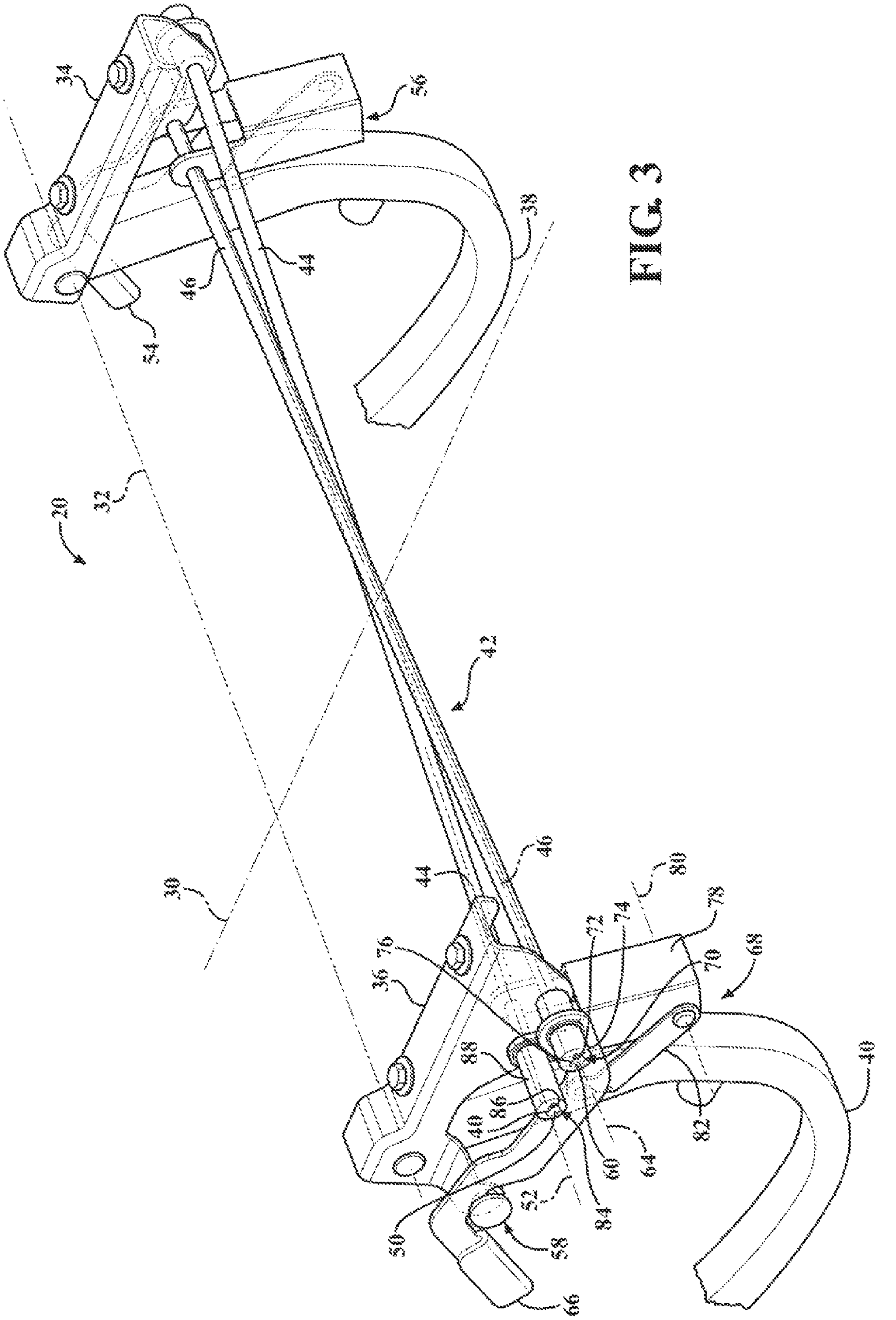
FIG. 3 is a schematic perspective view from a second angle of the hinge assembly.

Referring to FIGS. 2 and 3, the hinge assembly 20 includes a first hinge box 34 and a second hinge box 36. The second hinge box 36 is laterally spaced from the first hinge box 34 across the longitudinal axis 30 of the body 26. Accordingly, the first hinge box 34 and the second hinge box 36 are disposed on opposing lateral sides of the longitudinal axis 30. Each of the first hinge box 34 and the second hinge box 36 are attached to the body 26. The first hinge box 34 and the second hinge box 36 may be attached to the body 26 in any suitable fashion, such as for example, with fasteners such as bolts and/or screws.

A first support member 38 is rotatably attached to the first hinge box 34. A second support member 40 is rotatably attached to the second hinge box 36. The first support member 38 and the second support member 40 are attached to and support the decklid 24 relative to the body 26. The first support member 38 and the second support member 40 are configured for simultaneous rotation about the rotation axis 32 between the closed position and the open position to rotate the decklid 24 between the closed position and the open position. The first support member 38 and the second support member 40 may be shaped in any suitable manner, such as but not limited to the gooseneck configuration shown in the Figures.

A torque mechanism 42 interconnects the first hinge box 34 and the second hinge box 36 with the first support member 38 and the second support member 40. The torque mechanism 42 is pre-loaded to assist in opening 28 the decklid 24. The torque mechanism 42 is configured for applying a torque to at least one of the first support member 38 and the second support member 40 to assist the simultaneous movement of the first support member 38 and the second support member 40 from the closed position into the open position.

The torque mechanism 42 includes a first torque rod 44 and a second torque rod 46. The first torque rod 44 extends between and is rotatably supported by the first hinge box 34 and the second hinge box 36. The first torque rod 44 includes a first axial end 48 that is disposed adjacent the first hinge box 34, and a second axial end 50 that is disposed adjacent the second hinge box 36. The first torque rod 44 is substantially straight, and extends linearly along a first rod axis 52, which is straight. As used herein, the term substantially straight is defined as being generally straight with only minor manufacturing or bending induced variation from a straight line, and with no intentional placed bends and/or curves. The first rod axis 52 is disposed along the longitudinal center of the first torque rod 44. The first axial end 48 and the second axial end 50 of the first torque rod 44 are linearly disposed and extend along the first rod axis 52, with each of the first axial end 48 and the second axial end 50 of the first torque rod 44 extending linearly outboard away from the longitudinal axis 30 beyond a respective one of the first hinge box 34 and the second hinge box 36. As used herein, the term outboard is defined as disposed farther from. Accordingly, the first axial end 48 and the second axial end 50 are disposed farther from the longitudinal axis 30 than the first hinge box 34 and/or the second hinge box 36. As shown and described herein, the first axial end 48 of the first torque rod 44 is disposed adjacent and outboard of the first hinge box 34 and the second axial end 50 of the first torque rod 44 is disposed adjacent and outboard of the second hinge box 36.

A first lever 54 is attached to and rotatable with one of the first axial end 48 and the second axial end 50 of the first torque rod 44. The first lever 54 is secured in a position relative to one of the first hinge box 34 and the second hinge box 36. As shown, the first lever 54 is attached to and rotatable with the first axial end 48 of the first torque rod 44, and secured in a position relative to the first hinge box 34. The first lever 54 is rotationally fixed relative to the first axial end 48 of the first torque rod 44 such that rotation of the first lever 54 rotates the first torque rod 44.

A first linkage system 56 interconnects another of the first axial end 48 and the second axial end 50 of the first torque rod 44, and one of the first support member 38 and the second support member 40. As shown, the first linkage system 56 interconnects the second axial end 50 of the first torque rod 44 with the second support member 40. The first linkage system 56 transfers a torque from the first torque rod 44 to the one of the first support member 38 and the second support member 40. The torque applied to the first support member 38 and/or the second support member 40 assists the simultaneous movement of the first support member 38 and/or the second support member 40 from the closed position into the open position. As shown, the first linkage system 56 transfers the torque from the first torque rod 44 to the second support member 40.

The first axial end 48 and the second axial end 50 of the first torque rod 44 are pre-loaded with a twisting moment relative to each other to generate the twisting torque that is stored within the first torque rod 44. During assembly, the first lever 54 is rotated into position and secured in that position relative to the first hinge box 34. This rotation, about the first rod axis 52, twists the first torque rod 44 between the first axial end 48, secured to the first lever 54, and the second axial end 50, secured to the first linkage system 56, thereby generating the torque used to assist in opening 28 the decklid 24. The first hinge box 34 includes a retention feature 58 that is configured for securing the first lever 54 in position relative to the first hinge box 34. The retention feature 58 prevents the rotation of the first lever 54 in a direction that would allow the first torque rod 44 to untwist, and also resists lateral movement away from the longitudinal axis 30 to prevent unintentional disengagement of the first lever 54 from the retention feature 58.

The second torque rod 46 extends between and is rotatably supported by the first hinge box 34 and the second hinge box 36. The second torque rod 46 includes a first axial end 60 that is disposed adjacent the second hinge box 36, and a second axial end 62 that is disposed adjacent the first hinge box 34. As such, the relative positions of the first axial end 60 and the second axial end 62 of the second torque rod 46 are reversed from those of the first torque rod 44. The second torque rod 46 is substantially straight, and extends linearly along a second rod axis 64, which is straight. The second rod axis 64 is disposed along the longitudinal center of the second torque rod 46. The first axial end 60 and the second axial end 62 of the second torque rod 46 are linearly disposed and extend along the second rod axis 64, with each of the first axial end 60 and the second axial end 62 of the second torque rod 46 extending linearly outboard away from the longitudinal axis 30 beyond a respective one of the first hinge box 34 and the second hinge box 36. Accordingly, the first axial end 60 and the second axial end 62 of the second torque rod 46 are disposed farther from the longitudinal axis 30 than the first hinge box 34 and/or the second hinge box 36. As shown and described herein, the first axial end 60 of the second torque rod 46 is disposed adjacent and outboard of the second hinge box 36 and the second axial end 62 of the second torque rod 46 is disposed adjacent and outboard of the first hinge box 34.

A second lever 66 is attached to and rotatable with one of the first axial end 60 and the second axial end 62 of the second torque rod 46. The second lever 66 is secured in a position relative to one of the first hinge box 34 and the second hinge box 36. As shown, the second lever 66 is attached to and rotatable with the first axial end 60 of the second torque rod 46, and secured in a position relative to the second hinge box 36. The second lever 66 is rotationally fixed relative to the first axial end 60 of the second torque rod 46 such that rotation of the second lever 66 rotates the second torque rod 46.

A second linkage system 68 interconnects another of the first axial end 60 and the second axial end 62 of the second torque rod 46, and one of the first support member 38 and the second support member 40. As shown, the second linkage system 68 interconnects the second axial end 62 of the second torque rod 46 with the first support member 38. The second linkage system 68 transfers a torque from the second torque rod 46 to the one of the first support member 38 and the second support member 40. The torque applied to the first support member 38 and/or the second support member 40 assists the simultaneous movement of the first support member 38 and/or the second support member 40 from the closed position into the open position. As shown, the second linkage system 68 transfers the torque from the second torque rod 46 to the first support member 38.

The first axial end 60 and the second axial end 62 of the second torque rod 46 are pre-loaded with a twisting moment relative to each other to generate the twisting torque that is stored within the second torque rod 46. During assembly, the second lever 66 is rotated into position and secured in that position relative to the second hinge box 36. This rotation, about the second rod axis 64, twists the second torque rod 46 between the first axial end 60, secured to the second lever 66, and the second axial end 62, secured to the second linkage system 68, thereby generating the torque used to assist in opening 28 the decklid 24. The second hinge box 36 includes a retention feature 58 that is configured for securing the second lever 66 in position relative to the second hinge box 36. The retention feature 58 prevents the rotation of the second lever 66 in a direction that would allow the second torque rod 46 to untwist, and also resists lateral movement away from the longitudinal axis 30 to prevent unintentional disengagement of the second lever 66 from the retention feature 58.

Figure 4:
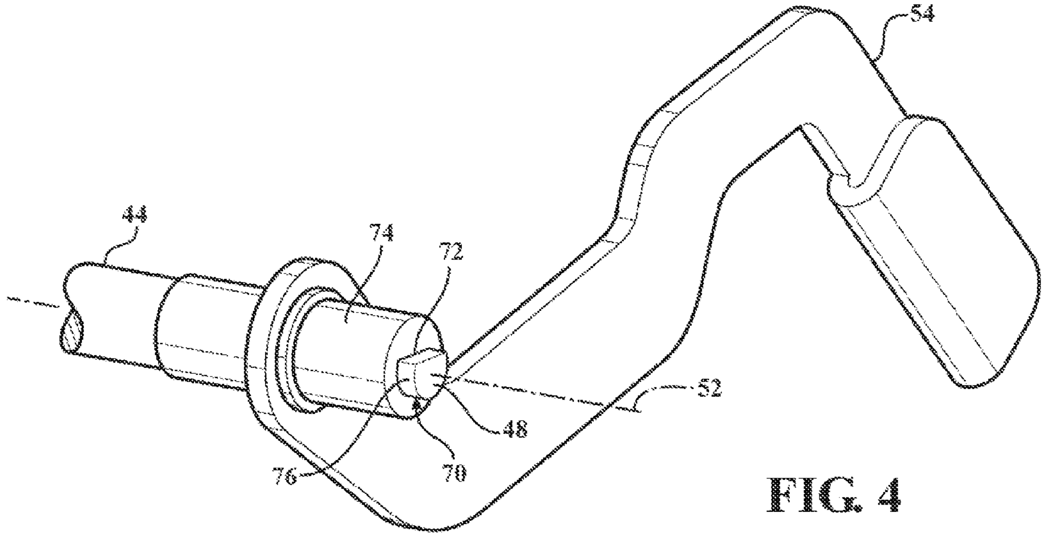
FIG. 4 is a schematic perspective view of a lever of the hinge assembly.

The first lever 54 and the second lever 66 each include a rotational locking mechanism 70 rotationally securing the first lever 54 to the first torque rod 44 and the second lever 66 to the second torque rod 46. The rotational locking mechanism 70 may include any mechanism capable of rotationally securing the first lever 54 and the second lever 66 to the first torque rod 44 and the second torque rod 46 respectively, while maintaining the straight axial orientation of the first torque rod 44 and the second torque rod 46 respectively. In other words, the rotational locking mechanism 70 rotationally secures the first lever 54 and the second lever 66 to the first torque rod 44 and the second torque rod 46 respectively without bending the respective axial ends of the first torque rod 44 and/or the second torque rod 46. For example, referring to FIG. 4, the rotational locking mechanism 70 may include a lever aperture 72 having a non-annular shape defined by the first lever 54 and/or the second lever 66. As shown, a lever barrel portion 74 is welded or otherwise securely attached to the first lever 54 and/or the second lever 66, with the lever barrel portion 74 defining the lever aperture 72. As shown in FIGS. 2 and 3, the lever aperture 72 is in mated engagement with a lever extension 76 of the first torque rod 44 and/or the second torque rod 46. The lever extension 76 includes a non-annular shape that corresponds to the non-annular shape of the lever aperture 72. As shown, the non-annular shape of the lever aperture 72 and the non-annular shape of the lever extension 76 define a D-shaped configuration. However, it should be appreciated that other non-annular shapes may alternatively be used.

Referring to FIGS. 2 and 3, the first linkage system 56 and the second linkage system 68 are identical, with each including a torque link 78 that is attached to and rotatable with the first torque rod 44 and the second torque rod 46 respectively. The torque link 78 extends radially away from the first rod axis 52 or the second rod axis 64 respectively to a distal pivot point 80, which is laterally spaced from the first rod axis 52 and the second rod axis 64 respectively. The first linkage system 56 and the second linkage system 68 further include a connecting member 82 having a first end rotatable coupled to the torque link 78 at the pivot point 80 and a second end rotatably coupled to the second support member 40 and the first support member 38 respectively.

Figure 5:
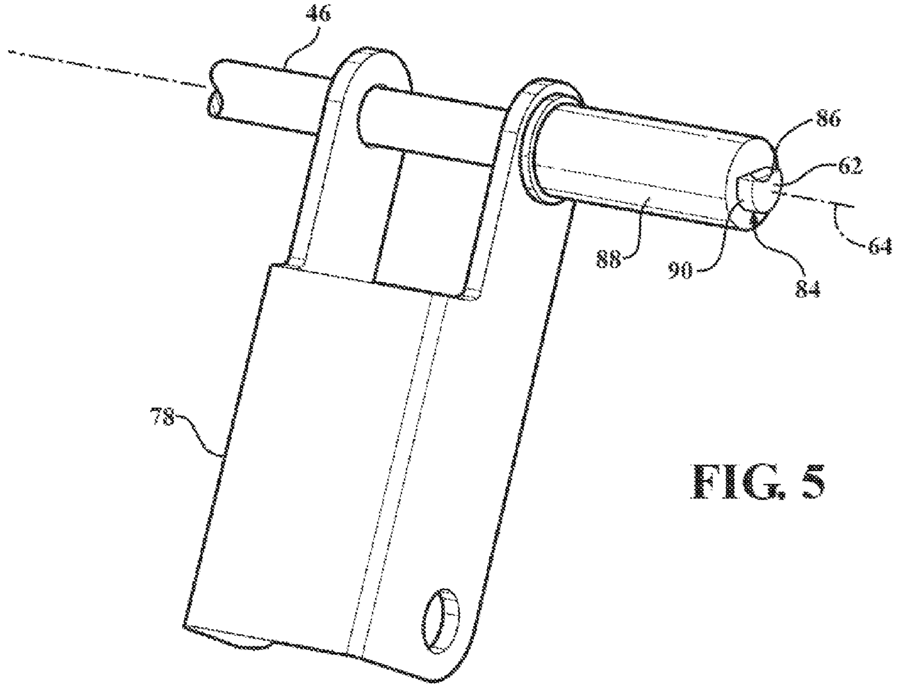
FIG. 5 is a schematic perspective view of a torque link of the hinge assembly.

The torque link 78 of each of the first linkage system 56 and the second linkage system 68 includes a rotational locking mechanism 84 rotationally securing the torque link 78 to the first torque rod 44 and the second torque rod 46 respectively. The rotational locking mechanism 84 may include any mechanism capable of rotationally securing the torque link 78 of the first linkage system 56 and the second linkage system 68 to the first torque rod 44 and the second torque rod 46 respectively, while maintaining the straight axial orientation of the first torque rod 44 and the second torque rod 46. In other words, the rotational locking mechanism 84 rotationally secures the torque link 78 of the first linkage system 56 and the second linkage system 68 to the first torque rod 44 and the second torque rod 46 respectively without bending the respective axial ends of the first torque rod 44 and/or the second torque rod 46. For example, referring to FIG. 5, the rotational locking mechanism 84 may include a link aperture 86 having a non-annular shape defined by the torque link 78 of the first linkage system 56 and the second linkage system 68. As shown, a link barrel portion 88 is welded or otherwise securely attached to the torque link 78 of the first linkage system 56 and the second linkage system 68, with the link barrel portion 88 defining the link aperture 86. As shown in FIGS. 2 and 3, the link aperture 86 is in mated engagement with a link extension 90 of the first torque rod 44 and the second torque rod 46 respectively. The link extension 90 includes a non-annular shape that corresponds to the non-annular shape of the link aperture 86. As shown, the non-annular shape of the link aperture 86 and the non-annular shape of the link extension 90 define a D-shaped configuration. However, it should be appreciated that other non-annular shapes may alternatively be used.

While the best modes for carrying out the invention have been described in detail, those familiar with the art to which this invention relates will recognize various alternative designs and embodiments for practicing the invention within the scope of the appended claims.

The invention claimed is:

1. A decklid hinge assembly for a vehicle, the decklid hinge assembly comprising:

- a first hinge box and a second hinge box spaced from the first hinge box, wherein each of the first hinge box and the second hinge box are configured for attachment to the vehicle;
- a first support member rotatably attached to the first hinge box, and a second support member rotatably attached to the second hinge box, wherein the first support member and the second support member are configured for simultaneous rotation about a rotation axis between a closed position and an open position;
- a torque mechanism including:
  - a first torque rod extending between and rotatably supported by the first hinge box and the second hinge box, wherein the first torque rod includes a first axial end and a second axial end pre-loaded with a twisting moment relative to the first axial end to generate a twisting torque;
  - wherein the first torque rod is substantially straight and extends along a first rod axis, with the first axial end and the second axial end of the first torque rod disposed along the first rod axis;
  - a first lever attached to and rotatable with one of the first axial end and the second axial end of the first torque rod and secured in a position relative to one of the first hinge box and the second hinge box; and
  - a first linkage system interconnecting another of the first axial end and the second axial end of the first torque rod and one of the first support member and the second support member, and configured for transferring the torque from the first torque rod to the one of the first support member and the second support member to assist the simultaneous movement of the first support member and the second support member from the closed position into the open position.

2. A decklid hinge assembly as set forth in claim 1 wherein the first hinge box and the second hinge box are disposed on opposing lateral sides of a longitudinal axis, with the each of the first axial end and the second axial end of the first torque rod extending outboard away from the longitudinal axis beyond a respective one of the first hinge box and the second hinge box.

3. A decklid hinge assembly as set forth in claim 2 wherein the first lever includes a rotational locking mechanism rotationally securing the first lever to the first torque rod.

4. A decklid hinge assembly as set forth in claim 3 wherein the rotational locking mechanism includes an aperture defined by the first lever and having a non-annular shape, in mated engagement with a first extension of the first torque rod having a non-annular shape corresponding to the non-annular shape of the aperture.

5. A decklid hinge assembly as set forth in claim 4 wherein the non-annular shape of the aperture and the non-annular shape of the first extension define a D-shaped configuration.

6. A decklid hinge assembly as set forth in claim 3 wherein the first linkage system includes a torque link attached to and rotatable with the first torque rod, and extending radially away from the first rod axis to a distal pivot point laterally spaced from the first rod axis.

7. A decklid hinge assembly as set forth in claim 6 wherein the torque link includes a rotational locking mechanism rotationally securing the torque link to the first torque rod.

8. A decklid hinge assembly as set forth in claim 6 wherein the first linkage system includes a connecting member having a first end rotatably coupled to the torque link at the pivot point and a second end rotatably coupled to one of the first support member and the second support member.

9. A decklid hinge assembly as set forth in claim 8 wherein the torque mechanism further includes:

- a second torque rod extending between and rotatably supported by the first hinge box and the second hinge box, wherein the second torque rod includes a first axial end and a second axial end pre-loaded with a twisting moment relative to the first axial end to generate a twisting torque;
- wherein the second torque rod is substantially straight and extends along a second rod axis, with the first axial end and the second axial end of the second torque rod disposed along the second rod axis;
- a second lever attached to and rotatable with one of the first axial end and the second axial end of the second torque rod and secured in a position relative to one of the first hinge box and the second hinge box; and
- a second linkage system interconnecting another of the first axial end and the second axial end of the second torque rod and one of the first support member and the second support member, and configured for transferring the torque from the second torque rod to the one of the first support member and the second support member to assist the simultaneous movement of the first support member and the second support member from the closed position into the open position.

10. A decklid hinge assembly as set forth in claim 9 wherein the first axial end of the first torque rod is disposed adjacent and outboard of the first hinge box and the second axial end of the first torque rod is disposed adjacent and outboard of the second hinge box, and wherein the first axial end of the second torque rod is disposed adjacent and outboard of the second hinge box and the second axial end of the second torque rod is disposed adjacent and outboard of the first hinge box.

11. A decklid hinge assembly as set forth in claim 10 wherein the first lever is attached to the first axial end of the first torque rod adjacent the first hinge box, and wherein the second lever is attached to the first axial end of the second torque rod adjacent the second hinge box.

12. A decklid hinge assembly as set forth in claim 11 wherein the first linkage system interconnects the second axial end of the first torque rod and the second support member, and wherein the second linkage system interconnects the second axial end of the second torque rod and the first support member.

13. A decklid hinge assembly as set forth in claim 12 wherein the first hinge box includes a retention feature configured for securing the first lever in position relative to the first hinge box, and wherein the second hinge box includes a retention feature configured for securing the second lever in position relative to the second hinge box.

14. A vehicle comprising:

a body extending along a longitudinal axis and defining an opening;

a decklid coupled to the body and configured for sealing the opening;

a decklid hinge assembly rotatably attaching the decklid to the body for rotation about a rotation axis between a closed position and an open position, the decklid hinge assembly including:

a first hinge box and a second hinge box laterally spaced from the first hinge box across the longitudinal axis of the body, wherein each of the first hinge box and the second hinge box are attached to the body;

a first support member rotatably attached to the first hinge box, and a second support member rotatably attached to the second hinge box, wherein the first support member and the second support member are configured for simultaneous rotation about the rotation axis between the closed position and the open position;

a torque mechanism configured for applying a torque to the first support member and the second support member to assist the simultaneous movement of the first support member and the second support member from the closed position into the open position, the torque mechanism including:

a first torque rod extending between and rotatably supported by the first hinge box and the second hinge box, wherein the first torque rod includes a first axial end disposed adjacent the first hinge box, and a second axial end disposed adjacent the second hinge box;

wherein the first axial end and the second axial end of the first torque rod are pre-loaded with a twisting moment relative to each other to generate a twisting torque;

wherein the first torque rod is substantially straight and extends along a first rod axis, with the first axial end and the second axial end of the first torque rod disposed along the first rod axis;

a first lever attached to and rotatable with the first axial end of the first torque rod and secured in a position relative to the first hinge box;

a first linkage system interconnecting the second axial end of the first torque rod and the second support member, and configured for transferring the torque from the first torque rod to the second support member;

a second torque rod extending between and rotatably supported by the first hinge box and the second hinge box, wherein the second torque rod includes a first axial end disposed adjacent the second hinge box, and a second axial end disposed adjacent the first hinge box;

wherein the second torque rod is substantially straight and extends along a second rod axis, with the first axial end and the second axial end of the second torque rod disposed along the second rod axis;

wherein the first axial end and the second axial end of the second torque rod are pre-loaded with a twisting moment relative to each other to generate a twisting torque;

a second lever attached to and rotatable with the first axial end of the second torque rod and secured in a position relative to the second hinge box;

a second linkage system interconnecting the second axial end of the second torque rod and the first support member, and configured for transferring the torque from the second torque rod to the first support member.

15. A vehicle as set forth in claim 14 wherein each of the first lever and the second lever include a rotational locking mechanism rotationally securing the first lever to the first torque rod and the second lever to the second torque rod respectively.

16. A vehicle as set forth in claim 15 wherein each of the first linkage system and the second linkage system include a torque link, with the torque link of the first linkage system attached to and rotatable with the second axial end of the first torque rod and extending radially away from the first torque rod to a distal pivot point laterally spaced from the first torque rod, and the torque link of the second linkage system attached to and rotatable with the second axial end of the second torque rod, and extending radially away from the second torque rod to a distal pivot point laterally spaced from the second torque rod.

17. A vehicle as set forth in claim 16 wherein each of the first linkage system and the second linkage system include a connecting member having a first end rotatably coupled to the torque link at the pivot point and a second end rotatably coupled to one of the first support member and the second support member.

18. A vehicle as set forth in claim 17 wherein the first axial end of the first torque rod and the second axial end of the second torque rod extend away from the longitudinal axis outboard of the first hinge box, and wherein the second axial end of the first torque rod and the first axial end of the second torque rod extend away from the longitudinal axis outboard of the second hinge box.

* * * * *